United States Patent [19]

Yoshioka et al.

[11] Patent Number: 4,615,901

[45] Date of Patent: Oct. 7, 1986

[54] PROCESS FOR PREPARING FOODSTUFF HAVING FIBER STRUCTURE

[75] Inventors: Tetsuo Yoshioka, Takasago; Takatsugu Yamamoto, Kobe; Toshihiko Nishiyama, Kyoto; Hiroyuki Fujita, Shiga; Shigeki Ashida, Otsu, all of Japan

[73] Assignee: Kanegafuchi Kagaku Kogyo Kabushiki Kaisha, Osaka, Japan

[21] Appl. No.: 666,536

[22] Filed: Oct. 30, 1984

[51] Int. Cl.⁴ .............................................. A23J 3/00
[52] U.S. Cl. .................................. 426/656; 426/802; 426/516
[58] Field of Search ............... 426/516, 496, 506, 656, 426/802

[56] References Cited

U.S. PATENT DOCUMENTS

| | | | |
|---|---|---|---|
| 2,730,448 | 1/1956 | Boyer et al. | 426/802 |
| 3,645,747 | 2/1972 | Palmer | 426/802 |
| 3,778,522 | 12/1973 | Strommer | 426/516 |
| 3,814,823 | 6/1974 | Yang et al. | 426/656 |
| 4,038,431 | 7/1977 | Hildebolt | 426/802 |
| 4,038,432 | 7/1977 | Hildebolt | 426/802 |
| 4,125,634 | 11/1978 | Plaskett | 426/802 |
| 4,154,856 | 5/1979 | Akin | 426/802 |

*Primary Examiner*—Raymond N. Jones
*Assistant Examiner*—Carolyn Paden
*Attorney, Agent, or Firm*—Armstrong, Nikaido, Marmelstein & Kubovcik

[57] ABSTRACT

A process for preparing foodstuff having continuous fiber structure which involves forming a wet mixture by adding meat stuff and/or other foods to wheat gluten alone or to a mixture of wheat gluten with other vegetable proteins, stretching the wet mixture, and heating the wet mixture in a high-temperature dry atmosphere, wherein steam is mixed with air alone or with a mixture of air and an inert gas, and the relative humidity is maintained within the range of 75 to less than 100%.

8 Claims, No Drawings

PROCESS FOR PREPARING FOODSTUFF HAVING FIBER STRUCTURE

BACKGROUND OF THE INVENTION

1. Field of the Invention

Various methods have been proposed to get fiber structure from wheat gluten, without employing the spun fiber method, because of its structural characteristics. However, many of the products obtained by these methods were found to be not fibrous but rather flaky, fishwormy, or spongy, thus being far different from the fiber structure. On the other hand, a method of obtaining continuous fiber structure without employing the spun fiber method has been developed, but it is not yet satisfactory from the aspects of quality, utility, or facility cost.

2. Description of the Prior Art

Though U.S. Pat. No. 3,814,823 refers to the materials, compositions, and stretching methods for preparing "meat analog" having fiber structure, it is failed to study the heating process, upon which the taste or flavor of the product is considerably dependent. The present inventors have made intensive studies on the heating method with the purpose of improving the taste or flavor of the product and at the same time reducing the amounts of steam or other utilities consumed.

SUMMARY OF THE INVENTION

Under these circumstances, the present invention provides a process for preparing foodstuff having fiber structure, in which aforesaid disadvantages of the prior art have been overcome.

More particularly, the present invention provides a process for preparing a foodstuff having continuous fiber structure, which comprises forming a wet mixture by adding meat stuff and/or other foods to wheat gluten alone or to a mixture of wheat gluten with other vegetable proteins, stretching the wet mixture, and heating the wet mixture in a high-temperature dry atmosphere, wherein steam is mixed with air alone, or a mixture of air with an inert gas, and the relative humidity is maintained at 75 to less than 100%.

DETAILED DESCRIPTION

The present invention relates to a novel process for preparing foodstuff having fiber structure, by other than a spun fiber method, from meat stuff and/or other foods, and wheat gluten alone or a mixture of wheat gluten and other vegetable proteins.

The wheat gluten employed in the present invention includes wet gluten and vital gluten obtained from wheat by conventional processes, which is used alone or in admixture. Other vegetable proteins employed in the present invention include proteins of various types, such as isolated or condensed proteins of soybeans, cotton seeds, corn, leaf protein, or other vegetable, which is used alone or in admixture. The meat stuff for the present invention includes animal meat, fowl meat, fish meat, molluscan meat or other edible proteins from living being which is used alone or in admixture. The other foods used in the present invention includes cashew nut, peanut, almond, or ther nuts; pulp of peach, prune, apricot or other fruits; butter, cheese or other dairy products; wakame(Undaria), laminaria or other seaweeds; seasonings, oils, fats, coloring matters, flavors, or other auxiliary foods for improving the flavor, texture or appearance of the food, which is used alone or in admixture.

In the preparation of a wet mixture (hereinafter referred to as a mixture), an appropriate reducing agent, protease, or glutathione can be added to cut the S—S bands or the peptide linkages of the elastic wheat gluten according to the physical properties desired. The water content of the mixture is adjusted to be within the range of 40 to 80 w/w %, and the mixture is quantitatively transferred to the next stretching process. The mixture can be extruded into a pipe or cylindrical shape or into a sheet shape through a nozzle provided with a slit, and is then formed into a continuous sheet having a thickness of about 4 to 20 mm and breadth of about 100 to 1000 mm in the stretching process. The sheet is stretched at least 2.5-fold in the stretching process, whereby the fiber structure interwined at random is endowed with directionality. The resulting sheet is transferred to the next heating process.

In the heating process, the sheet is heated in a so-called dry atmosphere by a heating means wherein steam is mixed with air so that the relative humidity is within the range of 75 to less than 100% and the temperature is adjusted within the range of 75° to 120° C. Temperature may be determined by resistance thermometer or thermocouple. If the environment in the heating means are outside the range of 75° to 120° C. in heating temperature and 75 to less than 100% in relative humidity, the products suffer from many disadvantages. For example, if the temperature is lower than 75° C., it is difficult to get a uniform and sufficient fiber structure of the sheet by heating, and therefore the heating period must be extremely prolonged, which is not desirable from the aspects of quality stabilization and productivity. On the other hand, if the heating temperature exceeds 120° C., the swell inside the sheet becomes so remarkable that the product suffers from disadvantages in quality, such as inferior appearance and weakened structure. If the relative humidity is lower than 75%, dry skin is formed on the surface of the sheet because the raise of the surface temperature cannot be controlled, which leads to the ununiform drying in the steps following the drying process so that an ununiformity of moisture distribution of the product is caused and further disadvantages the texture of the product. On the other hand, if the relative humidity exceeds 100%, in other words, if the sheet is heated in saturated steam, the steam cost is increased and the seasoning material is lost by the drips as described later. It is preferred to heat the sheet under stretching in the heating means, because the fiber characteristics can be improved thereby. Although the stretching ratio varies in dependence on the formulation of the mixture, it is generally preferred from a viewpoint of productivity to stretch the sheet 3- to 15-fold, including the stretching process.

The following advantages can be obtained by adjusting the conditions of the atmosphere in the heating means such that the heating temperature is within the range of 75 to 120° C. and the relative humidity from 75 to 100%.

(1) The energy cost, i.e. steam cost can be remarkably cut down. For example, the steam cost can be decreased by 50 to 70% compared with those of heating by hot water or hot saline solution, and by about 10% compared with that of ordinary wet-heating by steam.

(2) The product can be remarkably improved in quality and have a variety of formulation. More particularly, when hot water or hot saline solution is used as the heating means, as much as 5 to 10% of the blended seasoning materials is lost in the process, and even in the ordinary wet-heating by steam, 2 to 4% of the blended seasoning materials is lost by water dropped from the sheet. In that case, the technical difficulties in re-adjusting the taste of the product overweighs the problem of the loss of the materials. These problems can be solved in the present invention, wherein the materials are heated in a dry atmosphere. Moreover, the method of the present invention enables the blend of those which are likely to be lost in the presence of water, and therefore the production of good with a variety of flavors. The conditions of the high temperature dry atmosphere can be adjusted also by introducing nitrogen or other inert gas into the atmosphere and raising the proportion of the inert gas, whereby the material can be heated under less oxidative conditions even if easily oxidized substances are incorporated therein. The quality of the product can thus be stabilized in wide application.

(3) The physical properties of the mixture are free from effect by heating. When the mixture is very soft of fragile, the material is often excessively stretched or undergoes structural destruction during the heating by hot water of hot saline solution, which prevents the continuous heating. There are substantially no restrictions in the method of the present invention by the physical properties of the mixture. The heating can be controlled far more easily in the method of the present invention than the ordinary wet-heating by steam, because the stretch of the sheet and the water transported to the sheet are less, The apparatus for the production can therefore be considerably compact.

Any combination of meat stuff or other food is therefore enabled by the present invention, for example, beef, pork, or other animal meat; chicken, wild duck, turkey or other fowl meat; cod, tuna, bonito, horse mackerel or other fish meat; squid, octopus, shortnecked clam, corbiculidae or other molluscan meat or other edible protein from living being can be freely blended, as well as almond, hazelnut, pine nut, hemp nut or other nuts; dry parsley, dry welsh onion or other dry vegetables; wakame, laminaria or other seaweeds; cheese, butter, yogurt, casein, or other dairy product; soybean oil, cotton seed oil, beef fat, lard or other edible oils and fats; enolitake (flammulina), shiitake(lentinus) or other mushrooms; agar, corn starch, konjak or ther polysaccharides; and and further seasoning materials, coloring matters, flavors, vitamins, or minerals. Accordingly, a variety of processed food, nutrition-enriched food, healthy food, or other which have never been obtained by the prior art, can be prepared.

The period of time necessitated in the heating process, though it depends on the formulation, is preferred to be within the range of 3 to 15 min. The fiber-forming effect by stretching in the heating process is as previously described. Multi-stage stretching is more effective than single stretching to get a fiber structure. The heated sheet is optionally passed through a seasoning vessel and transfered to the next drying process.

The sheet must be dried uniformly in the drying process to prevent the over-drying of only the sheet surface. The sheet is dried until the water content of the product is reduced to the desired level. The dried sheet is cut into the desired shape according to the object, for example, into the shape like split or flattened dried squid for a dainty bits, into strips with the image of beef jerky or dry meat, or into cubes with the image of "kaku-ni" (cooked fish meat cubes). The processed food can also be provided in combination with other food. Foodstuff having the possibility of providing a new type of food can be prepared in this way by the present invention.

The present invention will now be described in more detail by the following examples, but these examples are not intended to limit the scope of the present invention.

EXAMPLE 1

| wet gluten | 70 kg |
| ground meat of cod fish | 10 kg |
| corn starch | 5 kg |
| squid extract | 13 kg |
| common salt | 2 kg |
| squid flavor | 0.1 kg |

The above ingredients were mixed to form a wet mixture having a water content of about 57%. The mixture, extruded form a nozzle having a slit height of 10 mm and breadth of 500 mm, was transfered to the stretching process, where the mixture was stretched about 3-fold and transfered to the heating process. The sheet was heated for about 15 min under stretching 2-fold on the first stage and further 2-fold on the second stage, in the heating process wherein the atmosphere was maintained at a temperature of 85° C. and a relative humidity of 90%. The sheet was dried in the next drying process until the water content of the sheet was reduced to the predetermined level, cut into sheet fractions, and split into strips by a squid splitting machine. About 57 kg of fibrous food like split dried squid having a water content of about 25% was obtained.

On the other hand, the same amount of a same wet mixture as above was processed in the same apparatus under the same conditions as above except that the heating process was altered as follows to prepare about 46 kg of a fibrous food like split dried squid having a water content of about 25%. The heating process comprised two stage vessels filled with a hot saline solution respectively, the salt concentration of which was 8%, at a temperature of 85° C. The sheet was passed through the hot solution under stretching 2-fold on the first stage and further 2-fold on the second stage, and heated for about 15 min.

The yields, flavor losses, and the evaluations of taste of these products prepared by the two methods are shown for comparison in Table 1.

The effect of the present invention is evidently understood from Table 1.

TABLE 1

| Heating method in the heating process | Yield*[1] | Flavor residual rate | Exudation of solid ingredients | Achievement of the desired taste*[2] |
|---|---|---|---|---|
| The present invention | 100 | 70% | about 1% | 20/20 |
| Hot saline solution | 84 | 50% | about 20% | 7/20 |

*[1]The yield of the present invention is assumed to be 100.
*[2]Evaluated by panelists consisting of 10 males and 10 females. The denominator represents the total number of test subjects and the numerator represents the number of subjects who preceived an alteration in taste.

EXAMPLE 2

| wet gluten | 55 kg |
| vital gluten | 5 kg |
| wheat starch | 5 kg |
| beef | 10 kg |

| | |
|---|---|
| beef extract | 20 kg |
| common salt | 3 kg |
| natural coloring matter | 1 kg |
| meat flavor | 0.01 kg |

The above ingredients were mixed to form a wet mixture having a water content of about 60%. The mixture was extruded through a nozzle having a slit height of 15 mm and breadth of 800 mm to form a sheet, which was stretched about 2-fold in the stretching process. Nitrogen gas in an amount half that of the air blown into the heating means was separately blown into the means and mixed with the air. The sheet was heated for about 10 min under stretching 2-fold on the first stage, 1.5-fold on the second stage, and further 1.5-fold on the third stage in an stmosphere wherein the temperature was maintained at 95° C. and at 95% relative humidity. The sheet was then transfered to the drying process, dried until the water content was reduced to the pre-determined level, and cut into strips like beef jerky. About 50 kg of the meat-flavored processed food having fiber structure was obtained in this way.

Separately, the same amount of a same wet mixture as above was processed for comparison into the same same beef-jerky-like product under the same conditions except that the heating was effected by saturated steam or hot saline solution. These products were stored for prolonged period in an air bath wherein the temperature was maintained at 60° C. and the relative humidity at 60% to examine changes in taste with time. The results are shown in Table 2.

As evidently understood from Table 2, the stability of the taste of the product of the present invention is superior to those prepared by other methods.

TABLE 2

| Heating method | Days of storage | | | |
|---|---|---|---|---|
| | 3 days | 1 week | 3 weeks | 6 weeks |
| The present invention | 0/20 | 0/20 | 0/20 | 3/20 |
| Saturated steam | 0/20 | 2/20 | 5/20 | 10/20 |
| Hot saline solution | 2/20 | 10/20 | 20/20 | 20/20 |

Note:
The taste was evaluated organoleptically by 10 males and 10 females. The deterioration in taste was represented by the number of the monitors out of 20 who were conscious of the changes in taste. The denominator represents the total number of test subjects and the numerator represents the number of subjects who precevied an alteration in taste.

EXAMPLE 3

| | |
|---|---|
| Wet gluten | 60 kg |
| isolated soy protein | 5 kg |
| wheat starch | 8 kg |
| wakame | 10 kg |
| salad oil (safflower oil) | 5 kg |
| HVP (hydrolized vegetable protein) | 10 kg |
| KCl | 2 kg |

The above ingredients were mixed to form a wet mixture havjing a water content of about 45%. The mixture was extruded from a pipe having a diameter of 60 mm into a cylindrical shape, which was pressed flat by rollers under stretching 5-fold and transfered to the heating process. The mixture was heated for about 3 min under stretching 1.5-fold on the first stage and further 1.5-fold on the second stage in the heating process wherein the atmosphere was maintained at a temperature of 105° C. and at a relative humidity of 97%. The mixture was then dried in the drying process until the water content was reduced to the predetermined level, and processed into cubes of about 6 mm square. About 64 kg of cubic foodstuff having fiber structure suitable for healthy food was obtained.

1000 kg portions of the above foodstuff were prepared for comparison using a wet mixtures of same components listed above, by the heating method of the present invention, by wet-heating by saturated steam, and by an 8% hot saline solution of 95° to 98° C. The amounts of the steam consumed in each method were measured and shown in Table 3.

As understood by the figure shown in Table 3, the utility cost is remarkably reduced by the present invention.

TABLE 3

| Heating method | The present invention | Saturated steam (wet-heating) | 8% hot saline solution |
|---|---|---|---|
| Amount of the steam consumed*[1] | 100 | 108 | 210 |

*[1]The amount of the steam consumed in the method of the present invention is assumed to be 100.

We claim:
1. A process for preparing foodstuff having fiber structure, which comprises forming a wet mixture by adding food matter to wheat gluten alone or to a mixture of wheat gluten with other vegetable proteins, adjusting the moisture content of the mixture within the range of 40 to 80 wt. vol. % and extruding the material, stretching the wet mixture at least 2.5 fold, and heating the stretched wet mixture in a high-temperature dry atmosphere wherein steam is mixed with air alone or with a mixture of air and an inert gas, and the relative humidity is maintained within the range of 75 to less than 100% and the temperature of the high-temperature dry atmosphere is within the range of 75° to 120° C. and drying the resultant product until the water content is reduced to a desired level.

2. The process of claim 1, wherein the wheat gluten is selected from at least one of wet gluten and vital gluten.

3. The process of claim 1, wherein the other vegetable protein is at least one selected from isolated or condensed proteins or other various types of proteins of soybean cotton seed, corn, peanut, leaf protein or other vegatables.

4. The process of claim 1, wherein the meat stuff is at least one selected from animal meat, fowl meat, fish meat, and molluscan meat.

5. The process of claim 1, wherein the food matter is at least one selected from nuts, fruit pulps, seaweeds, dairy products, seasoning materials, coloring matters, flavors, oils, and fats.

6. The process of claim 1, wherein the wet mixture is stretched in the stretching process and the heating process, so that it is stretched 3- to 15-fold in the total stretch ratio.

7. The process of claim 1, wherein the inert gas is nitrogen gas.

8. The process of claim 1, wherein the wet mixture is formed into a continuous sheet prior to heating.

* * * * *